United States Patent
Shiohara

(10) Patent No.: US 10,313,619 B2
(45) Date of Patent: Jun. 4, 2019

(54) PHOTOGRAPHING APPARATUS INCLUDING AN OSCILLATOR OUTPUTTING AN OUTPUT SIGNAL BASED ON WHICH A FIRST TIMING SIGNAL AND A SECOND TIMING SIGNAL ARE GENERATED

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/432,418

(22) Filed: Feb. 14, 2017

(65) Prior Publication Data

US 2017/0264849 A1   Sep. 14, 2017

(30) Foreign Application Priority Data

Mar. 11, 2016 (JP) ................................. 2016-047939

(51) Int. Cl.
| | |
|---|---|
| *H04N 5/228* | (2006.01) |
| *H04N 5/376* | (2011.01) |
| *H04N 5/232* | (2006.01) |
| *H04N 5/06* | (2006.01) |

(52) U.S. Cl.
CPC ............ *H04N 5/3765* (2013.01); *H04N 5/06* (2013.01); *H04N 5/23229* (2013.01); *H04N 5/23293* (2013.01)

(58) Field of Classification Search
CPC .............................. H04N 5/3765; H04N 5/06

USPC ...................................................... 348/222.1
See application file for complete search history.

(56) References Cited

U.S. PATENT DOCUMENTS

| | | | |
|---|---|---|---|
| 2007/0211153 | A1 | 9/2007 | Uchida et al. |
| 2011/0285694 | A1 | 11/2011 | Shiohara |
| 2011/0285734 | A1 | 11/2011 | Shiohara |
| 2011/0285894 | A1 | 11/2011 | Shiohara et al. |
| 2012/0320175 | A1 | 12/2012 | Takizawa et al. |
| 2012/0320176 | A1 | 12/2012 | Tanaka et al. |

(Continued)

FOREIGN PATENT DOCUMENTS

| | | |
|---|---|---|
| JP | 63-281582 A | 11/1988 |
| JP | 02-100477 A | 4/1990 |

(Continued)

OTHER PUBLICATIONS

The Extended European Search Report for the corresponding European Patent Application No. 17160436.6 dated Jun. 30, 2017.

*Primary Examiner* — Usman A Khan

(57) ABSTRACT

A photographing apparatus includes an oscillator, a first timing signal generator that generates a first timing signal based on an output signal of the oscillator, a second timing signal generator that generates a second timing signal based on the output signal of the oscillator, a phase difference control unit that is controlled so that a phase difference between the first timing signal and the second timing signal is a predetermined phase difference based on the output signal of the oscillator, a sensor that is driven based on the first timing signal, an image processing unit that generates an image to be displayed based on an output of the sensor, and a display unit that is driven based on the second timing signal and displays an image captured on the sensor.

5 Claims, 4 Drawing Sheets

(56) References Cited

U.S. PATENT DOCUMENTS

| | | | |
|---|---|---|---|
| 2014/0240542 A1* | 8/2014 | Toguchi | H04N 5/23293 |
| | | | 348/231.99 |
| 2015/0042860 A1 | 2/2015 | Shiohara et al. | |
| 2015/0381856 A1 | 12/2015 | Shiohara | |
| 2015/0381897 A1 | 12/2015 | Shiohara | |
| 2017/0163898 A1* | 6/2017 | Shiohara | H04N 5/23293 |

FOREIGN PATENT DOCUMENTS

| | | |
|---|---|---|
| JP | 06-292064 A | 10/1994 |
| JP | 07-007640 A | 1/1995 |
| JP | 08-163493 A | 6/1996 |
| JP | 09-307786 A | 11/1997 |
| JP | 11-296155 A | 10/1999 |
| JP | 2000-050150 A | 2/2000 |
| JP | 2001-228816 A | 8/2001 |
| JP | 2003-092698 A | 3/2003 |
| JP | 2007-243615 A | 9/2007 |
| JP | 2007-295096 A | 11/2007 |
| JP | 2010-268388 A | 11/2010 |
| JP | 2011-244170 A | 12/2011 |
| JP | 2011-249963 A | 12/2011 |
| JP | 2013-000450 A | 1/2013 |
| JP | 2013-000451 A | 10/2013 |
| JP | 2013-232761 A | 11/2013 |
| JP | 2015-106769 A | 6/2015 |
| WO | 2016/013185 A1 | 1/2016 |

* cited by examiner

PHOTOGRAPHING APPARATUS INCLUDING AN OSCILLATOR OUTPUTTING AN OUTPUT SIGNAL BASED ON WHICH A FIRST TIMING SIGNAL AND A SECOND TIMING SIGNAL ARE GENERATED

BACKGROUND

1. Technical Field

The present invention relates to a photographing apparatus that displays an image of a subject on a display unit.

2. Related Art

In the related art, a photographing apparatus that displays an image captured by a sensor on a display is known. In photographing apparatuses of recent years, a configuration in which an image processing is performed on a captured image and the image obtained by the image processing is displayed on a display is generally adopted. In this configuration, in order to prevent a delay before the image captured by the sensor is displayed on the display, various kinds of technique are developed. For example, in JP-A-2007-243615, a configuration that starts an image display on the display at a reproducing timing delayed by exactly ΔT from a driving timing of the sensor is disclosed.

In JP-A-9-307786, in order to reduce a circuit size and to reduce electromagnetic wave noise to be radiated, a configuration that drives the sensor and the display by an output signal of the same generator is disclosed.

In JP-A-2007-243615, a sensor and a display are driven by an output signal of separate clock generation units (clock generation unit 75 and clock generation circuit 27). In this manner, it is difficult to completely synchronize each clock signal generated by the separate clock generation units, and timings in a process of photographing and display are shifted relative to each other. Accordingly, even if the display and the sensor are driven at timings determined by each clock, and both of the timings are set so that the display is delayed by exactly ΔT with respect to the sensor, both of the driving times are shifted from an ideal timing in the process of photographing and display. As a result, it is difficult to maintain a state where the display is delayed by exactly ΔT with respect to the sensor, and a display delay longer than ΔT (for example, a delay of more than one frame) may occur as a result.

Although a configuration that drives the sensor and the display by the output signal of the same generator is disclosed in JP-A-9-307786, a configuration for preventing a display delay is not disclosed at all, in a configuration that displays an image captured by the sensor on the display after an image processing is performed in JP-A-9-307786.

SUMMARY

An advantage of some aspects of the invention is that the sensor and the display are accurately synchronized with each other in a state where the predetermined phase difference is disposed.

According to an aspect of the invention, a first timing signal and a second timing signal having the predetermined phase difference to the first timing signal are generated using the output signal of the common oscillator. Here, the predetermined phase difference is controlled based on the output signal of the common oscillator described above. The sensor is driven based on the first timing signal, and the display unit is driven based on the second timing signal.

According to this configuration, since the first timing signal, the second timing signal, and the predetermined phase difference are entirely generated and controlled based on the output signal of the common oscillator, it is possible to continue the photographing and the display in a situation where the relative timing between the first timing signal and the second timing signal is extremely accurate. For example, even though variation such as the cycle of the output signal of the oscillator is shifted by a temperature change occurs, since all the same variation of the first timing signal, the second timing signal and the predetermined phase difference is generated in accordance with the variation, the state where the phase difference between the first timing signal and the second timing signal is the predetermined phase difference is maintained. Accordingly, the sensor and the display unit can be accurately synchronized with each other in a state where the predetermined phase difference is disposed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Here, an embodiment of the invention will be described according to a following order.
(1) Configuration of Photographing Apparatus
(2) Configuration of Timing Generator
(3) Configuration of Error Information Acquisition Unit
(4) Another Embodiment

1. Configuration of Photographing Apparatus

Figure 1:
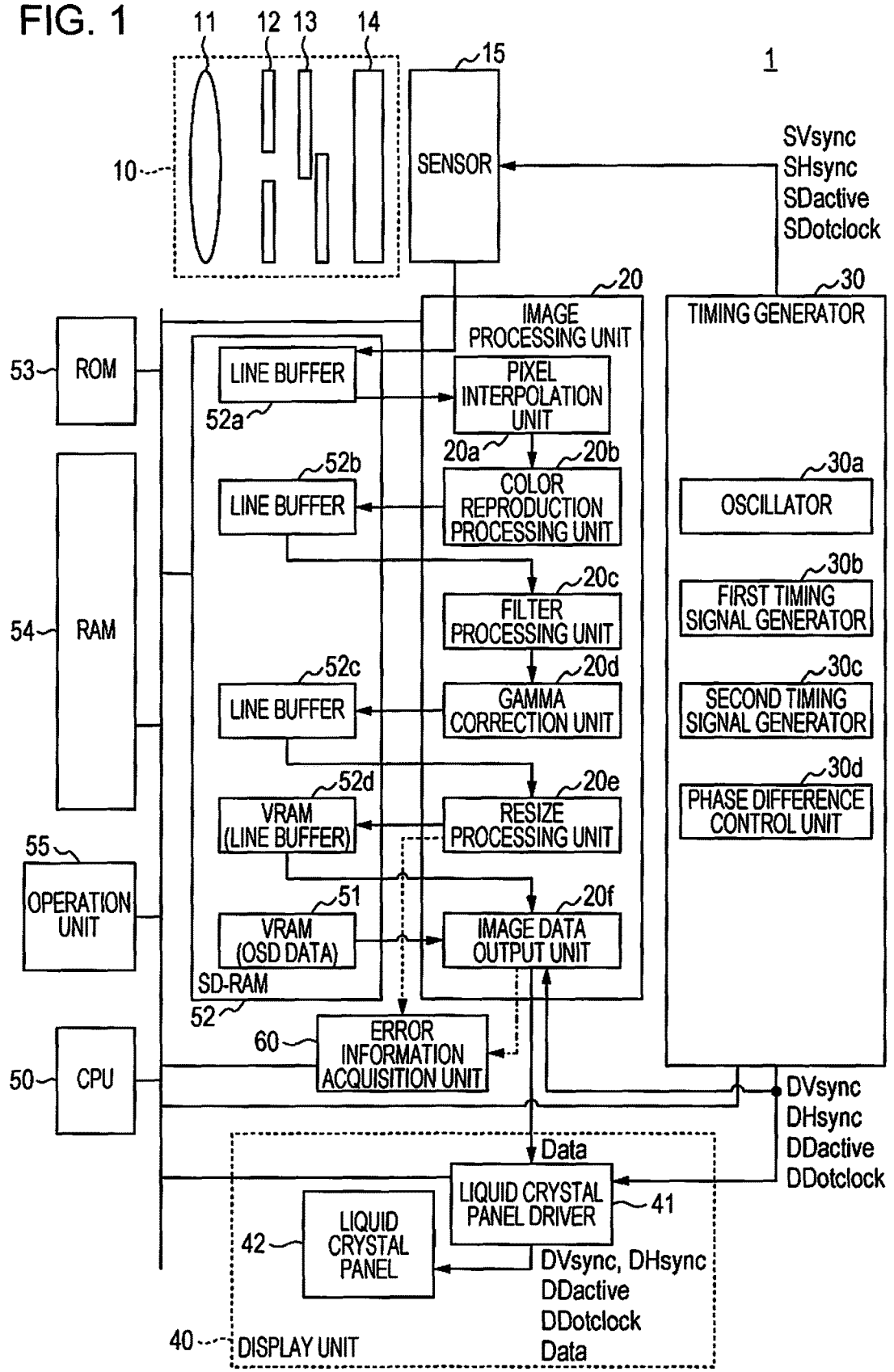
FIG. 1 is a block diagram according to an embodiment of the invention.

In FIG. 1, a photographing apparatus 1 according to an embodiment of the invention is provided with an optical system 10, a sensor (area image sensor) 15, a timing generator 30, a display unit 40, a CPU 50, a VRAM 51, an SD-RAM 52, a ROM 53, a RAM 54, an operation unit 55, and an error information acquisition unit 60. The CPU 50 uses appropriately the VRAM 51, the SD-RAM 52, and the RAM 54 to be capable of executing a program recorded on the ROM 53. The CPU 50 performs a function of generating image data that displays a subject captured by the sensor 15 in accordance with the operation on the operation unit 55 by the program. The operation unit 55 is provided with a shutter button, a dial switch as a mode switching section that switches the mode, a dial switch that switches an aperture and a shutter speed, and a push button that operates various kinds of setting menu, and a user can assign various instructions to the photographing apparatus 1 by the operation on the operation unit 55.

The optical system 10 is provided with a lens 11 that forms a subject image on the sensor 15, a aperture 12, a shutter 13 and a low-pass filter 14. The lens 11 and the aperture 12 of the optical system 10 are replaceably mounted on a housing (not illustrated). A solid state imaging element provided with a color filter arranged in a Bayer array and a plurality of photodiodes that accumulates charge corresponding to light intensity for each pixel by a photoelectric conversion, such as a complementary metal oxide semiconductor (CMOS) image sensor, a charge coupled device (CCD) image sensor is used as the sensor 15.

A pixel position of the sensor 15 is defined by coordinates in an orthogonal coordinate system, the line is configured by a plurality of pixels aligned in a direction parallel to one of coordinate axes, and a plurality of lines is configured to align in the direction perpendicular to a direction in which the pixels are aligned. In the specification, a direction parallel to a line is referred to as a horizontal direction, and a direction perpendicular to a line is referred to as a vertical direction. The sensor 15 is provided with the pixel of a predetermined number in the horizontal direction and the pixel of a predetermined number in the vertical direction (as a matter of course, the number of pixels in the horizontal direction may be different from that in the vertical direction). Here, one screen configured of all of the pixels is referred to as one frame.

The sensor 15 according to the embodiment performs an operation synchronized with various kinds of signal that the timing generator 30 outputs. That is, the timing generator 30 outputs a vertical synchronization signal (SVsync) that defines a period of time to read a detection result of the photodiode for one frame, a horizontal synchronization signal (SHsync) that defines a period of time to read a detection result of the photodiode for one line, and a data clock signal (SDotclock) that defines a read timing of the image data of each pixel (described later in detail).

In the embodiment, the vertical synchronization signal SVsync is also referred to as the first timing signal. The sensor 15 starts to output output data for one frame in accordance with the vertical synchronization signal SVsync. The sensor 15 reads sequentially the output data indicating the detection result of the photodiode corresponding to a portion of the pixel of the sensor 15 at a timing in accordance with the data clock signal SDotclock in the period of time defined by a data active signal SDactive within the period of time of the horizontal synchronization signal SHsync.

An image processing unit 20 is provided with a circuit that uses line buffers 52a to 52c and the VRAMs 52d and 51 for one or the plurality of the lines previously secured in the SD-RAM 52, and generates the image data by pipeline processing to display the subject image on the display unit 40 (described later). In the embodiment, the number of pixels included in the sensor 15 is different from that included in the display unit 40, and aspect ratios of both are also different. Therefore, the output data that the sensor 15 outputs in the image processing unit 20 is converted to the image data that can be displayed on the display unit 40 (thinning-out processing may be performed to the pixels in the horizontal direction and in the vertical direction by an interlaced scanning or processing of an adder in the sensor 15).

The image processing unit 20 is provided with a pixel interpolation unit 20a, a color reproduction processing unit 20b, a filter processing unit 20c, a gamma correction unit 20d, a resize processing unit 20e, and an image data output unit 20f for the conversion. The line buffer 52a is a buffer memory that temporarily records the output data output from the sensor 15, and the output data is temporarily recorded on the line buffer 52a if the output data is output from the sensor 15. The pixel interpolation unit 20a generates a color of two channels by interpolation processing, while taking the data of the number of lines required to generate the color of the two channels that are missed in each pixel in the Bayer array from the line buffer 52a. As a result, data of three channels is generated in each pixel.

Next, the color reproduction processing unit 20b performs color conversion processing for color matching by performing a matrix operation of 3×3 based on the generated data. That is, the data for one line is generated based on the data for three lines. The data generated by the color conversion processing is temporarily recorded on the line buffer 52b. Next, the filter processing unit 20c performs a sharpness adjustment or noise removal processing by filter processing. That is, the filter processing is performed by referring to the data of the number of lines required for the filter processing. Next, the gamma correction unit 20d performs gamma correction that compensates for a characteristic difference between a color indicated by a gradation value of the output data of the sensor 15 and a color indicated by a gradation value of the image data handled by the display unit 40. The data generated by the gamma correction is temporarily recorded on the line buffer 52c.

The number of pixels (number of lines and the number of pixels in the horizontal direction) of the data to be recorded on the line buffer 52c in a line sequential manner is dependent on the number of elements included in the sensor 15, and may be different from the number of pixels in the display unit 40. Therefore, the resize processing unit 20e performs interpolation calculation processing by sequentially referring to the data to be recorded on the line buffer 52c and performs resizing by identifying the gradation value of each channel at a location between the pixels. The generated image data is recorded on the VRAM 52d (may be the line buffer) in the line sequential manner.

The image data output unit 20f outputs the image data (Data) recorded on the VRAM 52d to the display unit 40 in the line sequential manner. The CPU 50 can generate OSD data to display various kinds of information with the subject image and records the OSD data on the VRAM 51. The image data output unit 20f acquires the OSD data recorded on the VRAM 51 in a predetermined timing (before or after the subject image data for one frame is output) and outputs the OSD data to the display unit 40 in the line sequential manner as the image data (Data). Coupling between the image data and the OSD data may be omitted (OSD display may not be performed).

The display unit 40 is an electronic view finder (EVF) that displays the image indicating the subject to be photographed and causes the user to recognize information, such as an aspect of the subject before photographing and photographing conditions and the photographing apparatus 1 according to the embodiment is a mirrorless digital camera provided with the EVF. The display unit 40 is provided with an interface circuit (not illustrated), a liquid crystal panel driver 41, a liquid crystal panel 42, and a eyepiece lens (not illustrated). The liquid crystal panel 42 according to the embodiment is a high temperature polysilicon thin film transistor (TFT) provided with three sub-pixels corresponding to the color filter of three colors for each pixel, a position of the pixel is defined by the coordinates in the orthogonal coordinate system. The line is configured by the plurality of pixels aligned in the direction parallel to one of the coordinate axes, and a plurality of lines is configured to align in the direction perpendicular to the direction in which the pixels are aligned. In the specification, the direction parallel to the line is referred to as the horizontal direction, the direction perpendicular to the line is referred to as the vertical direction, and one screen configured of entire pixels of the liquid crystal panel 42 is referred to as the one frame.

The liquid crystal panel driver 41 outputs the signal to drive the liquid crystal by applying a voltage to each sub-pixel to a liquid crystal panel 42. The liquid crystal panel 42 is provided with a gate driver and a soft driver (not illustrated). The gate driver controls a display timing in each pixel of each line in accordance with the signal output from the liquid crystal panel driver 41, and the soft driver applies a voltage corresponding to the image data of each pixel to each pixel of the line which is a display timing. Therefore, the liquid crystal panel 42 performs the display.

That is, the liquid crystal panel driver 41 is configured to output the various kinds of signal to display on the liquid crystal panel 42, for example, the vertical synchronization signal (DVsync) that defines the period of time to perform the display for one frame, the horizontal synchronization signal (DHsync) that defines the period of time to perform the display for one line, the data active signal (DDactive) that defines a capturing period of the image data in each line, the data clock signal (DDotclock) that defines a reading timing of the image data of each pixel, and the image data (Data) of each pixel.

The liquid crystal panel 42 starts the display based on the image data for one frame in accordance with the vertical synchronization signal DVsync, and applies the voltage corresponding to the image data Data for each pixel at the timing in accordance with the data clock signal DDotclock within the period of time defined by the horizontal synchronization signal DHsync and the data active signal DDactive to each pixel, and thus performs the display. The photographing apparatus 1 according to the embodiment is provided with the timing generator 30, the vertical synchronization signal DVsync, the horizontal synchronization signal DHsync, the data active signal DDactive, and the data clock signal DDotclock described above are generated by the timing generator 30 (described later in detail). In the embodiment, the vertical synchronization signal DVsync is also referred to as a second timing signal.

The liquid crystal panel 42 according to the embodiment is the panel provided with effective pixels of the predetermined number in the horizontal direction and that of the predetermined number in the vertical direction (as a matter of course, the number of pixels in the horizontal direction may be different from that in the vertical direction). The content and an output timing of the image data Data that the liquid crystal panel driver 41 outputs are adjusted. Therefore, the liquid crystal panel 42 can display gradation corresponding to the Data on any position. The embodiment is configured to display the subject image based on the output data of the sensor 15 on a subject image display region previously determined of the liquid crystal panel 42, and to display a text indicating information, such as the photographing condition on an information display region other than the subject image display region. That is, the text indicating the image of the subject and the information, such as the photographing condition is displayed on screen display (OSD) on the liquid crystal panel 42. Although the liquid crystal panel 42 is provided with multiple pixels than the effective pixels in the horizontal direction and in the vertical direction, a description of processing related to pixels other than the effective pixels will be omitted for simplicity in the specification.

The photographing apparatus 1 according to the embodiment displays the image data generated based on the output data that the sensor 15 outputs on the display unit 40 at the normal time. Accordingly, the user can confirm the subject, while using the display unit 40 as the EVF. In a case where the user performs a photographing instruction by operating the operation unit 55, the sensor 15 reads sequentially the output data indicating the detection result of the photodiode corresponding to the entire effective pixels in accordance with the photographing instruction. The image processing unit 20 generates the image data in a format, such as JPEG using the SD-RAM 52. The generated image data is recorded on the removable memory (not illustrated). That is, the user can generate the image data indicating the subject.

2. Configuration of Timing Generator

Figure 2:
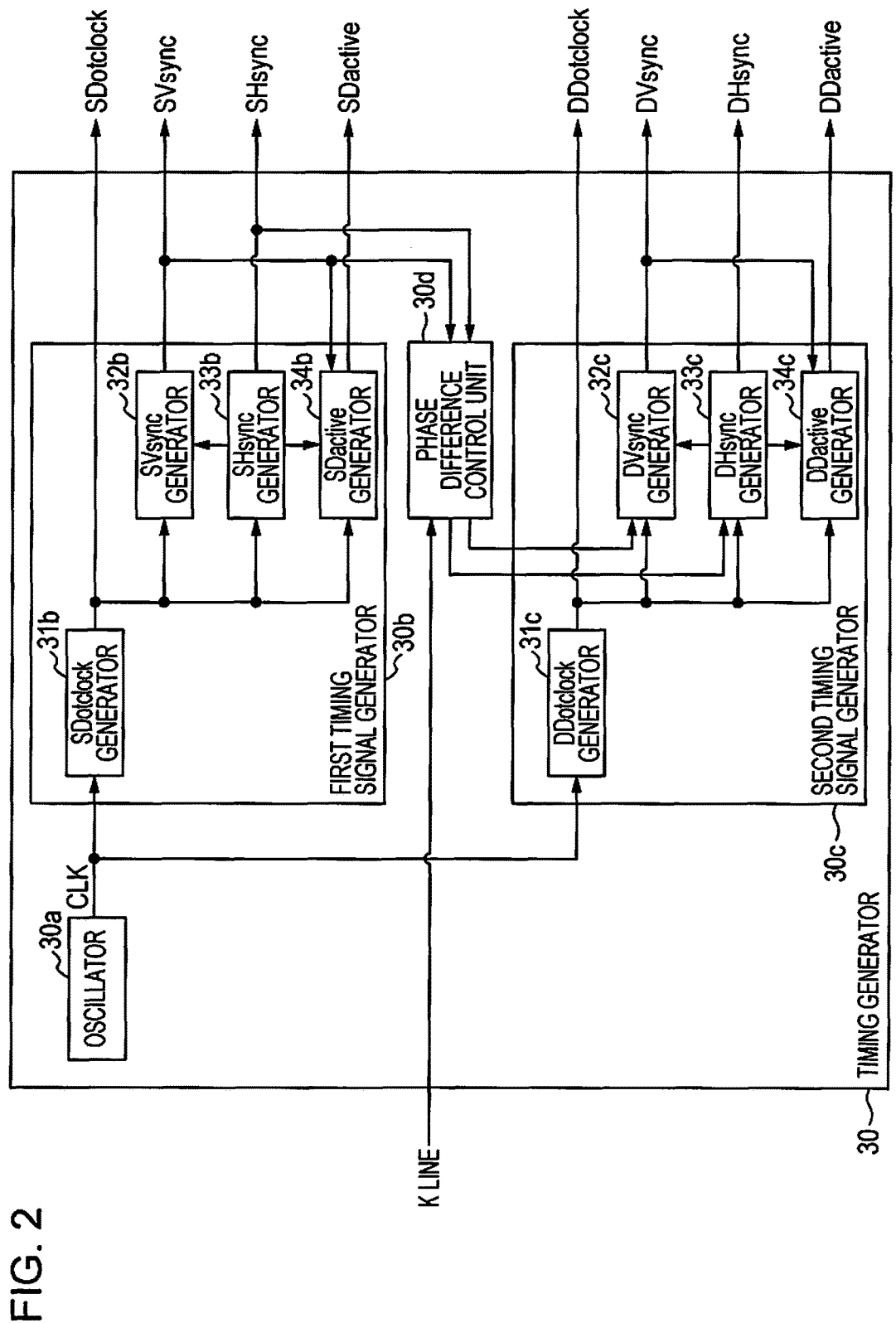
FIG. 2 is a diagram illustrating a configuration example of a timing generator.

In the photographing apparatus 1 configured as described above, the timing generator 30 controls phase difference between the first timing signal and the second timing signal, so that an excessive display delay or a destabilization of a display delay period does not occur. Specifically, the timing generator 30, as illustrated in FIGS. 1 and 2, is provided with an oscillator 30a, a first timing signal generator 30b, a second timing signal generator 30c, and a phase difference control unit 30d.

Figure 3:
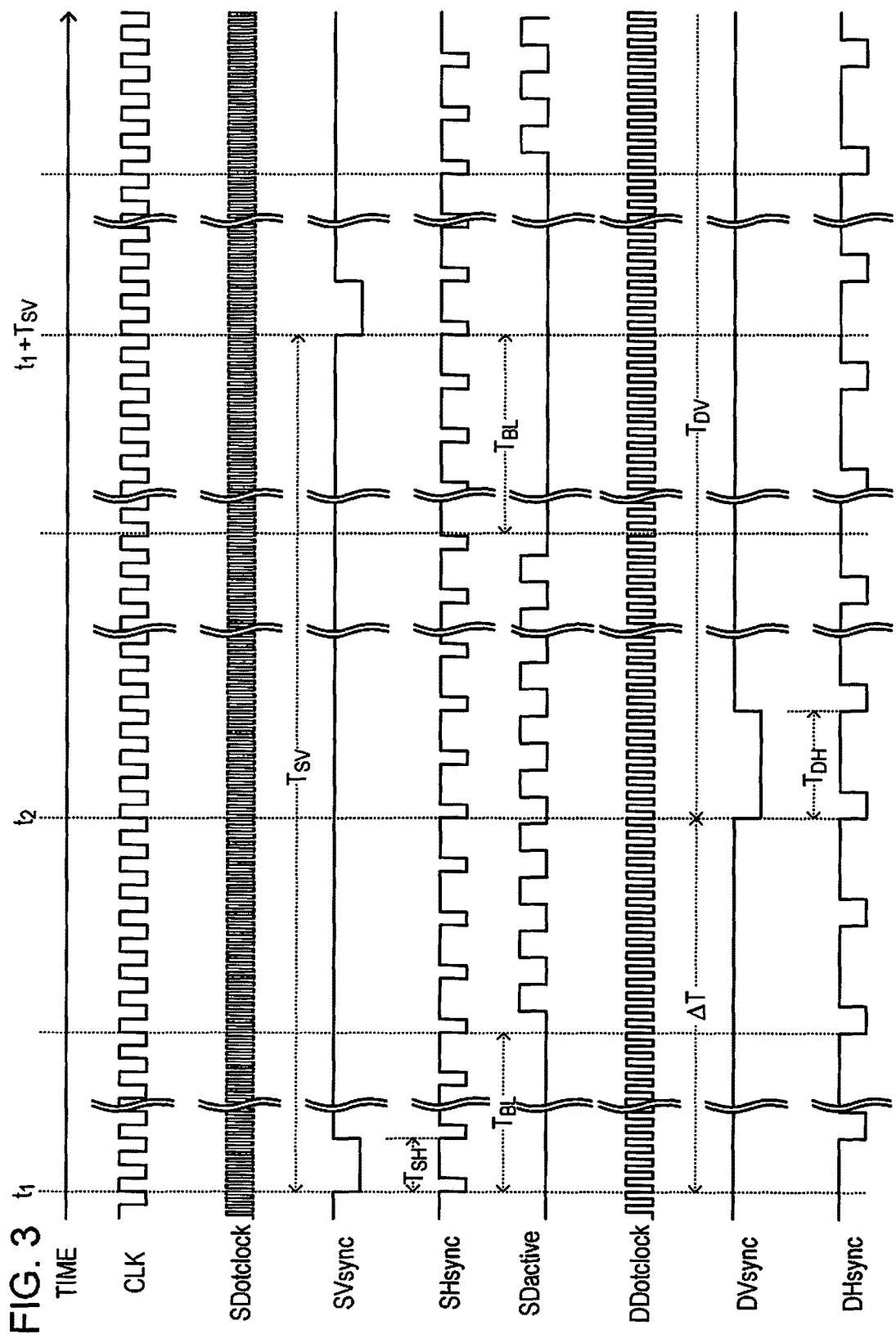
FIG. 3 is a timing chart of a signal that is handled by a timing generator.

The oscillator 30a is provided with a crystal oscillator, and outputs an output signal CLK of a predetermined frequency. FIG. 3 is a timing chart of a portion of a signal that is handled by the timing generator 30. The first timing signal generator 30b is a circuit that generates the signal, such as the first timing signal based on the output signal CLK of the oscillator 30a. Specifically, the first timing signal generator 30b is provided with an SDotclock generator 31b, an SVsync generator 32b, an SHsync generator 33b, and an SDactive generator 34b.

The SDotclock generator 31b is provided with a PLL circuit including a phase comparator, the low-pass filter, a voltage control oscillator, and a divider (not illustrated). In the embodiment, the SDotclock generator 31b can make the frequency of the output signal to be n/m times (n and m are an integer of one or more). The SDotclock generator 31b acquires the output signal CLK of the oscillator 30a, and converts the frequency at predetermined parameters of n and m to output the data clock signal SDotclock.

For example, the SDotclock generator 31b can process to convert the output signal CLK of 27 MHz to the data clock signal SDotclock of 216 MHz which is the frequency of eight times. An example in which the data clock signal SDotclock is generated by integrally multiplying the frequency of the output signal CLK is indicated in FIG. 3. As a matter of course, the frequency of the data clock signal SDotclock is optional depending on the configuration of the sensor 15, may be variable depending on a photographing mode, and may be variable when the user directly or indirectly instructs the parameter of n and m.

The data clock signal SDotclock that the SDotclock generator 31b generates is output to outside of the timing generator 30. The data clock signal SDotclock is input to the SVsync generator 32b, the SHsync generator 33b, and the SDactive generator 34b.

The SHsync generator 33b generates the horizontal synchronization signal SHsync indicating a photographing cycle TSH of one line at a timing synchronized with the data clock signal SDotclock which the SDotclock generator 31b outputs. That is, the photographing cycle TSH of one line is previously determined (may be variable depending on the photographing mode or the instruction of the user), and the period of time corresponding to the photographing cycle TSH of one line is defined by the count number of the data clock signal SDotclock in the embodiment. The SHsync generator 33b outputs the horizontal synchronization signal SHsync using the data clock signal SDotclock as a trigger, measures the photographing cycle TSH of one line by counting the data clock signal SDotclock after output of the horizontal synchronization signal SHsync. In a case where the photographing cycle TSH is elapsed, the SHsync generator 33b again repeats processing to output the horizontal synchronization signal SHsync using the data clock signal SDotclock as the trigger. In FIG. 3, the horizontal synchronization signal SHsync generated in this manner is illustrated as an example. The horizontal synchronization signal SHsync is output to the outside of the timing generator 30, the phase difference control unit 30d, the SVsync generator 32b, and the SDactive generator 34b.

The SVsync generator 32b generates the vertical synchronization signal SVsync indicating a photographing cycle TSV in one frame at a timing synchronized with the data clock signal SDotclock which the SDotclock generator 31b outputs. That is, the photographing cycle TSV of one frame is previously determined (may be variable depending on the photographing mode or the instruction of the user), and the period of time corresponding to the photographing cycle TSV of frame line is defined by the count number of the horizontal synchronization signal SHsync in the embodiment. The SVsync generator 32b counts the horizontal synchronization signal SHsync which the SHsync generator 33b outputs, and repeats processing to output the vertical synchronization signal SVsync each time when the horizontal synchronization signal SHsync corresponding to the photographing cycle TSV of one frame is counted. In FIG. 3, the vertical synchronization signal SVsync generated in this manner is illustrated as an example. The vertical synchronization signal SVsync is output to the outside of the timing generator 30, the phase difference control unit 30d, and the SDactive generator 34b.

The SDactive generator 34b generates the data active signal SDactive indicating the period of time when the photographing is actually performed in each line at a timing synchronized with the data clock signal SDotclock which the SDotclock generator 31b outputs. That is, a vertical blanking period TBL is previously determined in the photographing cycle TSV of one frame, the number Csh of the horizontal synchronization signal SHsync into which the first line of the data active signal SDactive is inserted is previously determined after the vertical synchronization signal SVsync. Furthermore, a photographing period excluding a back porch period and a front porch period in the photographing cycle TSH of one line is previously determined, and the back porch period is defined by the count number Csc of the data clock signal SDotclock in the embodiment.

The SDactive generator 34b counts the horizontal synchronization signal SHsync output by the SHsync generator 33b after acquiring the vertical synchronization signal SVsync. In a case where the count number of the horizontal synchronization signal SHsync becomes Csh, the SDactive generator 34b counts the data clock signal SDotclock after the subsequent horizontal synchronization signal SHsync. The SDactive generator 34b makes the data active signal SDactive active, in a case where the count number of the data clock signal SDotclock reaches Csc. After the data active signal SDactive becomes active, when the count number of the data clock signal SDotclock becomes the predetermined number, the SDactive generator 34b makes the data active signal SDactive inactive. The SDactive generator 34b outputs the data active signal SDactive indicating a valid photographing period by repeating this process. The data active signal SDactive is output to the outside of the timing generator 30.

The phase difference control unit 30d is a circuit in order to assign the predetermined phase difference between the vertical synchronization signal SVsync as the first timing signal and the vertical synchronization signal DVsync as the second timing signal (described later in detail), based on the output signal of the oscillator 30a. In the embodiment, the phase difference control unit 30d is provided with an interface that receives a value indicating the predetermined phase difference, and can set the predetermined phase difference, based on the received value by the interface. Specifically, when the user instructs a value K to the phase difference control unit 30d, the phase difference control unit 30d operates so that a difference corresponding to the photographing period that photographs K line on the sensor 15 is a predetermined phase difference.

In the embodiment, using the first timing signal as a reference, the phase is delayed by exactly the period of time that photographs K line on the sensor 15 (that is, a cycle of the horizontal synchronization signal SHsync×K) to the first timing signal and the second timing signal is output. Therefore, the phase difference control unit 30d monitors the output of the SVsync generator 32b and the SHsync generator 33b, after the vertical synchronization signal SVsync as the first timing signal is output by the SVsync generator 32b, counts the number of the horizontal synchronization signals SHsync output from the SHsync generator 33b, and in a case where the horizontal synchronization signal SHsync is counted K times, outputs the signal indicating the output timing of the second timing signal to a DVsync generator 32c and a DHsync generator 33c.

In FIG. 3, an example of a case where K=Csh+4 is illustrated (Csh is the number of the horizontal synchronization signals SHsync into which the first line of the data active signal SDactive is inserted after the vertical synchronization signal SVsync). That is, the phase difference control unit 30d counts Csh times the horizontal synchronization signal SHsync generated at a subsequent vertical blanking interval TBL, in a case of detecting a vertical blanking interval SVsync at time t1, furthermore, at time t2 counted four times the horizontal synchronization signal SHsync, and outputs the signal indicating the output timing of the second timing signal to the DVsync generator 32c and the DHsync generator 33c. In the embodiment, the phase difference corresponding to the period of time $\Delta T$ corresponding to Csh+four times of the cycle of the horizontal synchronization signal SHsync generated as described above is the predetermined phase difference. As a matter of course, a setting method of K can adopt various techniques, and in a case where a portion corresponding to described-above four is input as K by omitting the known Csh, may be configured so that the period of time corresponding to the Csh+K times of the cycle of the horizontal synchronization signal SHsync is obtained.

The second timing signal generator 30c is a circuit that generates the signal of the second timing signal, based on the output signal CLK of the oscillator 30a. Specifically, the second timing signal generator 30c is provided with a DDotclock generator 31c, the DVsync generator 32c, the DHsync generator 33c, and a DDactive generator 34c.

The DDotclock generator 31c is provided with a PLL circuit including a phase comparator, a low-pass filter, a voltage control oscillator, and a divider (not illustrated). In the embodiment, the DDotclock generator 31c can make the frequency of the output signal to be i/j times (i and j are an integer of one or more). The DDotclock generator 31c acquires the output signal CLK of the oscillator 30a, and converts the frequency at predetermined parameters of i and j to output the data clock signal DDotclock.

For example, the DDotclock generator 31c can process to convert the output signal CLK of 27 MHz to the data clock signal DDotclock of 54 MHz which is the frequency of two times. An example in which the data clock signal DDotclock is generated by integrally multiplying the frequency of the output signal CLK is indicated in FIG. 3. As a matter of course, the frequency of the data clock signal DDotclock is optional depending on the configuration of the display unit 40, may be variable depending on a photographing mode, and may be variable when the user directly or indirectly instructs the parameter of i and j. In a case where the number of pixels of the sensor 15 and the number of pixels of the display unit 40 are different from each other, in general, the cycle of the data clock signal SDotclock and DDotclock are different from each other.

The data clock signal DDotclock that the DDotclock generator 31c generates is output to the outside of the timing generator 30. The data clock signal DDotclock is input to the DVsync generator 32c, the DHsync generator 33c, and the DDactive generator 34c.

When the DHsync generator 33c receives the signal indicating the output timing of the second timing signal from the phase difference control unit 30d, the DHsync generator 33c generates the horizontal synchronization signal DHsync indicating a display cycle TDH of one line at a timing synchronized with the data clock signal DDotclock which the DDotclock generator 31c outputs. That is, the cycle TDH of one line is previously determined (may be variable depending on the photographing mode or the instruction of the user), and the period of time corresponding to the display cycle TDH of one line is defined by the count number of the data clock signal DDotclock in the embodiment. The DHsync generator 33c outputs the horizontal synchronization signal DHsync using the signal indicating the output timing of the second timing signal and the data clock signal DDotclock as a trigger, measures the display cycle TDH of one line by counting the data clock signal DDotclock after output of the horizontal synchronization signal DHsync. In a case where the display cycle TDH is elapsed, the DHsync generator 33c again repeats processing to output the horizontal synchronization signal DHsync using the data clock signal DDotclock as the trigger. In FIG. 3, the horizontal synchronization signal DHsync generated in this manner is illustrated as an example. The horizontal synchronization signal DHsync is output to the outside of the timing generator 30, the DVsync generator 32c, and the DDactive generator 34c.

When the DVsync generator 32c receives the signal indicating the output timing of the second timing signal from the phase difference control unit 30d, the DVsync generator 32c generates the vertical synchronization signal DVsync indicating a display cycle TDV of one frame at a timing synchronized with the data clock signal DDotclock which the DDotclock generator 31c outputs. That is, the DVsync generator 32c repeats processing to output the vertical synchronization signal DVsync using the signal indicating the output timing of the second timing signal and the data clock signal DDotclock as a trigger. In FIG. 3, the vertical synchronization signal DVsync generated in this manner is illustrated as an example. The vertical synchronization signal DVsync is output to the outside of the timing generator 30 and the DDactive generator 34c. Since the vertical synchronization signal DVsync is output by assigning a constant phase difference (corresponding to a delay period $\Delta T$) to the vertical synchronization signal SVsync, a length of the photographing cycle TSV of one frame and that of the display cycle TDV of one frame are coincided with each other in the embodiment.

The DDactive generator 34c generates the data active signal DDactive indicating the period of time when the photographing is actually performed in each line at a timing synchronized with the data clock signal DDotclock which the DDotclock generator 31c outputs. That is, the vertical blanking period is previously determined in the display cycle TDV of one frame, the number Cdh of the horizontal synchronization signal DVsync into which the first line of the data active signal DDactive is inserted is previously determined after the vertical synchronization signal DVsync. Furthermore, a display period excluding the back porch period and the front porch period in the display cycle TDH of one line is previously determined, and the back porch period is defined by the count number Cdc of the horizontal synchronization signal DHsync in the embodiment.

The DDactive generator 34c counts the horizontal synchronization signal DHsync output by the DHsync generator 33c after acquiring the vertical synchronization signal DVsync. In a case where the count number of the horizontal synchronization signal DHsync becomes Cdh, the DDactive generator 34c counts the data clock signal DDotclock after the subsequent horizontal synchronization signal DHsync. The DDactive generator 34c makes the data active signal DDactive active (not illustrated in FIG. 3), in a case where the count number of the data clock signal DDotclock reaches Cdc. After the data active signal DDactive becomes active, when the count number of the data clock signal DDotclock becomes the predetermined number, the DDactive generator 34c makes the data active signal DDactive inactive. The DDactive generator 34c outputs the data active signal DDactive indicating a valid photographing period by repeating this process. The data active signal DDactive is output to the outside of the timing generator 30.

In the embodiment, the sensor 15 is driven by the vertical synchronization signal SVsync generated as described above, and the display unit 40 is driven by the vertical synchronization signal DVsync. Here, since the vertical synchronization signal DHsync has the phase difference corresponding to the period of time $\Delta T$ to the vertical synchronization signal SVsync, the vertical synchronization signal DHsync is driven in a state where the display unit 40 is delayed for K-Csh lines to the sensor 15.

Here, the predetermined phase difference corresponding to the period of time $\Delta T$ is set so as to minimize the delay from a completion of photographing to a display start of the display unit 40 on the sensor 15, and so as not to generate the excessive display delay or the destabilization of the display delay period by maintaining the phase difference. That is, in the embodiment, although the display may be delayed than the photographing by exactly a very short period of time $\Delta T$ corresponding to the phase difference, the phase difference is set so as not to display the excessive display delay, such as the one frame. The phase difference is set so as not to generate the destabilization, such as the display delay from the photographing to the display is short on certain line and the display delay from the photographing to the display is long on the other line.

Specifically, in the embodiment, the length of the period of time that photographs on the sensor 15 the information of the number of lines required for the display of any line on the display unit 40 and the length of the period of time that processes the information of the required number of lines in the image processing unit 20 are identified. The predetermined phase difference is set so that the period of time of a sum of these periods is the photographing period for K-Csh lines.

That is, in the embodiment, the sensor 15 and the display unit 40 are configured of a plurality of lines and the image is handled for each line. For example, the output data indicating the image captured by the sensor 15 is accumulated on the line buffer 52a by a line unit, and is processed on the pixel interpolation unit 20a based on the data of one line or the plurality of the lines. Therefore, it is easy to represent the photographing period of the number of lines required for the display of one line by the integer multiple of the photographing cycle of one line of the sensor 15. It is easy to perform the photographing by the sensor 15 and image processing by the image processing unit 20, and to measure the period of time in which processing is performed by the image processing unit based on the data of one line or the plurality of the lines, by the photographing cycle of one line of the sensor 15 as the unit, while analyzing the photographing time or the image processing time for each line.

For example, in the image processing unit 20, the pixel interpolation unit 20a to the resize processing unit 20e start the processing after the data of the number of lines required for the processing is recorded on the line buffer. Accordingly, a standby time required until the start of the processing can be easily defined by the integer multiple (TSV×L: L is an integer) of the photographing cycle of one line. Although the standby times required for the processing in the resize processing unit 20e and the processing in the image data output unit 20f are not necessarily the integer multiple of the photographing cycle of one line, if the standby time, for example, is 0.3 times of the photographing cycle of the one line, the standby time can be defined as the integer multiple (TSV×M: M is an integer) of the photographing cycle of one line, by considering the standby time to one time of the photographing cycle of one line. As a result of the above, it is possible to represent a photographing period of the number of lines required for the display of one line by the integer multiple of the photographing cycle of one line of the sensor 15.

In this manner, if the period of time required for the photographing and the image processing is represented by (L+M) times, the integer multiple of the photographing cycle of one line, L+ M+ the above count number Csh becomes the value K. Accordingly, in order to ensure that the display line is not overtaken the photographing line (image to be displayed is generated until the display start timing), the minimum phase difference can be previously determined as the integer multiple (that is, the photographing period for K line) of the photographing period for photographing the one line of the sensor 15. Therefore, in the embodiment, the photographing period of K line corresponding to the minimum phase difference is previously determined, and the user is adapted to input the value of K to the phase difference control unit 30d. As a result, the predetermined phase difference is assigned between the vertical synchronization signal SVsync as the first timing signal and the vertical synchronization signal DVsync as the second timing signal. As a result, as well as a sufficient period of time for the display of certain line, the phase difference is assigned so as not to be prolonged more than necessary.

Furthermore, in the embodiment, the value K is assigned to the phase difference control unit 30d. Therefore, the ΔT which is the predetermined phase difference is set to be the photographing period for K line on the sensor 15. The phase difference control unit 30d outputs the signal indicating the output timing of the second timing signal, based on the vertical synchronization signal SVsync output by the SVsync generator 32b and the horizontal synchronization signal SHsync output by the SHsync generator 33b. That is, the phase difference control unit 30d regards the timing delayed by the count number K of the horizontal synchronization signal SHsync from the vertical synchronization signal SVsync, as the output timing of the second timing signal.

Here, the vertical synchronization signal SVsync and the horizontal synchronization signal SHsync are generated based on the data clock signal SDotclock, and the data clock signal SDotclock is further generated based on the output signal CLK of the oscillator 30a. Accordingly, in the phase difference control unit 30d, the period of time ΔT as the phase difference from the vertical synchronization signal SVsync as the first timing signal is said to be measured based on the output signal CLK of the oscillator 30a. The horizontal synchronization signal SHsync counts the horizontal synchronization signal SHsync in order to indicate the photographing cycle for one line. Therefore, the phase difference control unit 30d can easily identify the timing having the predetermined phase difference corresponding to the integer multiple of the photographing period of one line, and can easily generate the second timing signal having the predetermined phase difference to the first timing signal.

According to the above configuration, the first timing signal, the second timing signal, and the predetermined phase difference can provide the photographing apparatus 1 entirely generated and controlled based on the output signal of the common oscillator 30a. In the photographing apparatus 1, it is possible to continue the photographing and the display in a situation where the relative timing between the first timing signal and the second timing signal is extremely accurate. For example, even variation such as the cycle of the output signal of the oscillator 30a is shifted by a temperature change occurs, since all the same variation of the first timing signal, the second timing signal and the predetermined phase difference is generated in accordance with the variation, the state where the phase difference between the first timing signal and the second timing signal is the predetermined phase difference is maintained. Accordingly, the sensor 15 and the display unit 40 can be accurately synchronized with each other in a state where the predetermined phase difference is disposed.

3. Configuration of Error Information Acquisition Unit

The error information acquisition unit 60 is a circuit to acquire information indicating a presence or absence of an error in which a line image to be displayed on the liquid crystal panel 42 is not generated in the image processing unit 20. The error information acquisition unit 60 is provided with a memory (not illustrated). When the image processing for one line is completed, the image processing unit 20 outputs the information indicating a line the image processing is completed to the error information acquisition unit 60. Specifically, in the embodiment, when the image data for one line is completed in the resize processing unit 20e, the address indicating a storage position on the VRAM 52d and the image data after processing are output to the VRAM 52d. Furthermore, at this time, the resize processing unit 20e outputs the information indicating the processed line (for example, it may be address information, and may be information indicating a line number) to the error information acquisition unit 60. The information indicating the processed line is illustrated in FIG. 1 by an arrow of a dashed line. When the information indicating the processed line is input, the error information acquisition unit 60 causes the information to be stored on the memory (not illustrated). As a result, the information indicating the latest line of the image processed (resize processed which is the final process of the image processing in the embodiment (excluding the waiting process of an output standby)) is recorded on the memory.

Furthermore, the signal (DHsync or DDactive) instructing the timing to perform the display of the image for one line is input to the image data output unit 20f, and the image data output unit 20f outputs the image data Data for one line to the liquid crystal panel driver 41 in accordance with the signal. At this time, the image data output unit 20f outputs the information indicating the line output to the liquid crystal panel driver 41 (for example, it may be address information when the line data is stored on the VRAM 52d, and may be information indicating the line number) to the error information acquisition unit 60. The information indicating the line output to the liquid crystal panel driver 41 is illustrated in FIG. 1 by an arrow of a one-dot chain line. When the information indicating the line output to the liquid crystal panel driver 41 is input, the error information acquisition unit 60 causes the information to be stored on the memory (not illustrated). As a result, the information indicating the displayed latest line is recorded on the memory. Here, it may be able to identify the presence or absence of the error by comparison with the information indicating the latest line of the image processed and the information indicating the displayed latest line, and if the information is the information indicating the line number, the processing the period of time which is not the effective display period is excluded, such as the vertical blanking interval in the liquid crystal panel 42 is appropriately performed.

An example of processing for identifying the presence or absence of the error by comparison with the information indicating the latest line of the image processed and the information indicating the displayed latest line is described below. When the processing of the image data of (N−1)th line is completed, the resize processing unit 20e outputs the address indicating the storage position on the VRAM 52d and the processed image data to the VRAM 52d. When the output of the image data of (N−1)th line to the VRAM 52d is completed, the resize processing unit 20e outputs WRITE-END information of (N−1)th line (information indicating the line number of (N−1)th line) to the error information acquisition unit 60. Similarly, when the output of the image data of Nth line to the VRAM 52d is completed, the resize processing unit 20e outputs the WRITE-END information of Nth line (information indicating the line number of Nth line) to the error information acquisition unit 60. When the output of the image data of (N+1)th line to the VRAM 52d is completed, the resize processing unit 20e outputs the WRITE-END information of (N+1)th line (information indicating the line number of (N+1)th line) to the error information acquisition unit 60. Here, the WRITE-END information corresponds to the information indicating the latest line of the image processed.

On the other hand, the image data output unit 20f outputs the image data Data of (N−1)th line to the liquid crystal panel driver 41, and when the output is completed, outputs READ-END information of (N−1)th line (information indicating the line number of (N−1)th line) to the error information acquisition unit 60. Similarly, the image data output unit 20f outputs the image data Data of Nth line to the liquid crystal panel driver 41, and when the output is completed, the READ-END information of Nth line (information indicating the line number of Nth line) to the error information acquisition unit 60. The image data output unit 20f outputs the image data Data of (N+1)th line to the liquid crystal panel driver 41, and when the output is completed, outputs the READ-END information of (N+1)th line (information indicating the line number of (N+1)th line) to the error information acquisition unit 60. Here, the READ-END information corresponds to the information indicating the displayed latest line.

In a case of identifying the presence or absence of the error, the error information acquisition unit 60 identifies the presence or absence of the error by comparison with the latest WRITE-END information and the latest READ-END information. Specifically, if a relational expression of "the WRITE-END information≥the READ-END information +1" is not satisfied, it is determined as the error. For example, in a case where the image data of (N+1)th line is tried to be output to the liquid crystal panel driver 41 before the WRITE-END information of (N+1)th line is output to the error information acquisition unit 60, at that time, since the WRITE-END information the READ-END information +1 becomes N≥N+1, the relational expression is not satisfied, and it is determined as the error. Although it is necessary to perform a special determination on an upper portion and lower portion of one screen, and the determination to perform the display is performed merely after a writing of the line data to be displayed is completed, details of the special determination will be omitted here.

In the embodiment, it is possible to display the acquired information in the error information acquisition unit 60 on the display unit 40. That is, the user can assign an instruction to display the information indicating the presence or absence of the error on the display unit 40 by the operation unit 55 to the photographing apparatus 1. If the instruction is performed, the CPU 50 acquires the information recorded on the memory of the error information acquisition unit 60, and acquires a difference between the latest line number of the image processed and the displayed latest line number, based on the information indicating the latest line of the image processed and the information indicating the displayed latest line. The CPU 50 generates the OSD data to display the information, and records the OSD data on the VRAM 51. As a result, the information indicating the difference between the latest line number of the image processed and the displayed latest line number, that is, the information indicating a difference between a progress of an image generation in the image processing unit 20 and a progress of an image display on the display unit 40 is displayed on the display unit 40.

As a result, the user can confirm whether or not the predetermined phase difference is being operated as intended by the content displayed. That is, if the difference of the progress is greater than 0 (or if the difference is greater than a predetermined margin), the display does not overtake the photographing (including the image processing), and the predetermined phase difference can be determined to be appropriate. As a matter of course, a display aspect of the information indicating the presence or absence of the error can be assumed various aspects, may be a number indicating the difference of progress, may be a icon indicating the presence or absence of the error, and may be a display of color indicating the presence or absence of the error. As a matter of course, use of the error information is not limited to the display such as in the embodiment, in a case where an occurrence of the error is detected based on the error information, an interrupt signal is input to the CPU 50, and specific processing may be performed. Examples of the specific processing include the processing to record the occurrence of the error or the processing in accordance with the occurrence of the error. The processing may be performed by any of the control unit, for example, a dedicated firmware corresponding to an error processing.

4. Another Embodiment

Above embodiment is one example to perform the invention. To the extent that generates the first timing signal, the second timing signal, and the phase difference between both signals based on the common oscillator, it is possible to adopt various embodiments besides.

Figure 4:
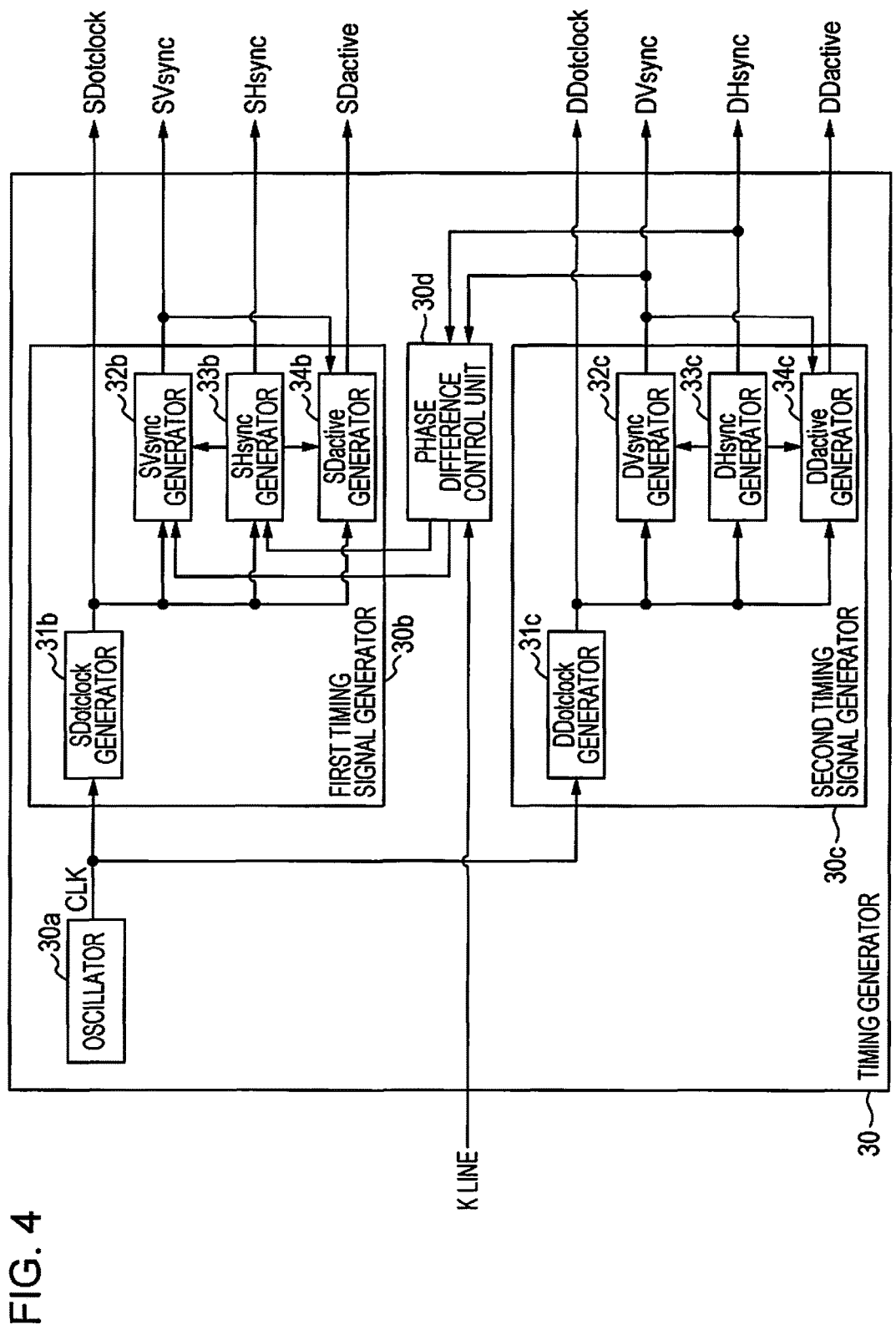
FIG. 4 is a diagram illustrating a configuration example of a timing generator.

For example, in the configuration to identify the period of time of the predetermined phase difference by the integer multiple of the signal the cycle, the signal cycle may be the display cycle of one line, other than the photographing cycle of one line described above. FIG. 4 illustrates a configuration example for this reason, and by modifying slightly an input and output relation of the signal and a function of the SVsync generator 32b and the SHsync generator 33b with respect to the timing generator 30 illustrated in FIG. 2, the configuration illustrated in FIG. 4 can be realized.

Specifically, in the configuration illustrated in FIG. 4, the circuit of the same reference numerals as FIG. 2 has substantially the same function. However, roles of the first timing signal generator 30b and the second timing signal generator 30c are replaced in FIGS. 2 and 4 in a forming of the phase difference. That is, in the second timing signal generator 30c, the vertical synchronization signal DVsync, the horizontal synchronization signal DHsync and the data active signal DDactive are generated based on the data clock signal DDotclock. The vertical synchronization signal DVsync and the horizontal synchronization signal DHsync are input to the phase difference control unit 30d, and the phase difference control unit 30d outputs the signal indicating the output timing of the first timing signal based on these signals at the timing delayed by exactly the display period of K-Cdh line from the vertical synchronization signal DVsync as the second timing signal.

The signal indicating the output timing of the first timing signal is input to the SVsync generator 32b and the SHsync generator 33b, the SVsync generator 32b outputs the vertical synchronization signal SVsync at the timing, and the SHsync generator 33b starts the output of the synchronized horizontal synchronization signal SHsync at the timing. As a result, in a state where the vertical synchronization signal SVsync as the first timing signal is delayed by exactly the predetermined phase difference, the timing generator 30 can be driven to the vertical synchronization signal DVsync as the second timing signal. Since the cycle of the vertical synchronization signal DVsync and the vertical synchronization signal SVsync is coincided with each other in here, according to the above configuration, in a state where a certain period of time is delayed from the photographing by the sensor 15, the photographing apparatus 1 maintained a state where the display unit 40 is driven can be provided.

Furthermore, the reference method of parameter to determine the predetermined phase difference is not limited to the example described above, and it is possible to adopt various reference methods besides. For example, in the configuration illustrated in FIG. 2, the vertical synchronization signal DVsync output by the DVsync generator 32c and the horizontal synchronization signal SHsync output by the SHsync generator 33b are input to the phase difference control unit 30d, and the phase difference may be configured to be controlled based on these signals and K times of the photographing cycle of one line.

That is, in a case where the vertical synchronization signal DVsync is input, the phase difference control unit 30d starts to count the horizontal synchronization signal SHsync, and in a case where the count number becomes MAXSHsync-K, the unit instructs to the SVsync generator 32b. The unit may be configured so as to output the vertical synchronizing signal SVsync. Here, the MAXSHsync is the number of the horizontal synchronization signals SHsync in one cycle of the vertical synchronization signal SVsync (cycle TSV of the vertical synchronization signal SVsync/cycle of the horizontal synchronization signal SHsync). As a result, the vertical synchronization signal DVsync as the second timing signal is configured to be output to the vertical synchronization signal SVsync as the first timing signal at the timing delayed by exactly ΔT.

As a matter of course, in the configuration illustrated in FIG. 4, the vertical synchronization signal SVsync output by the SVsync generator 32b and the horizontal synchronization signal DHsync output by the DHsync generator 33c are input to the phase difference control unit 30d, and the phase difference may be configured to be controlled based on these signals and K times of the display cycle of one line.

Furthermore, a configuration of the line buffer is an example of the processing content in the image processing unit 20, and other processing or the configuration of the buffer may be adopted. For example, the line buffer is disposed so as to accumulate the data of the number of lines required for a distortion aberration, and the image processing unit 20 may be configured to be capable of performing a distortion aberration correction of the lens 11.

Furthermore, although the display unit 40 is the EVF using the liquid crystal panel in the above embodiment, the display unit 40 may be the display unit other than the EVF, for example, the display unit using the liquid crystal panel attached to the rear surface of the photographing apparatus 1, and one using a method other than the liquid crystal panel. The photographing apparatus 1 may be a single-lens reflex camera having a mirror, further a movie camera, and an apparatus such as a mobile phone having the photographing function. Furthermore, the photographing apparatus 1 may be mounted on another apparatus, for example, a vehicle. Examples of the case include a configuration to capture the outside of the vehicle on the sensor 15 and to visually recognize the displayed image of the display unit 40 to the user inside of the vehicle.

Furthermore, although the color filter is a Bayer array in the sensor 15 described above, the invention may be applied to the photographing apparatus using the sensor configured of an array other than the Bayer array. Furthermore, a capacity of the VRAMs 52d and 51 is not limited, it may be the line buffer, and a memory providing a recording capacity to record the image data for one frame. According to this configuration, it is possible to perform various kinds of processing based on the image data to be displayed. Furthermore, a transmission form of the various kinds of signal from the timing generator 30 to the display unit 40 can adopt various forms, and it may be transmitted by a high-definition multimedia interface (HDMI: registered trade mark). It may be the direction in the embodiments described above in reverse, for example, it may be displayed from the left to the right, or from the right to the left in the horizontal direction.

Furthermore, the OSD data may be the image data indicating a predetermined information to be displayed in the information display region of the display unit, and may be configured to be the predetermined information in which the various kinds of information other than the photographing condition, for example, the information indicating the remaining amount of the battery mounted on the photographing apparatus 1 is to be displayed.

Furthermore, it may be configured to check whether or not the predetermined phase difference is set as intended. As a configuration for this reason, for example, a configuration that the information indicating a value directly and indirectly indicating the predetermined phase difference is output is included. As the latter, a configuration that outputs the information which can check whether or not the phase difference is as intended can be adopted. For example, the photographing apparatus 1 may be configured so as to output a line of a subject of image processing and a line to be displayed.

The configuration, for example, in the photographing apparatus as illustrated in FIG. 1, can be realized by a configuration that writes the information indicating the line of a subject of image processing and the information indicating the line to be displayed on the memory such as the VRAM 51, and displays these information with an OSD display on the display unit 40 by the user's instruction. That is, in the image processing unit 20, each time the image data output unit 20f outputs the data of one line, the value indicating the output line (initial value is 1) is incremented, the value is output on the VRAM 51 and stored. As the result, the value indicating the latest line of the image processed is recorded on the VRAM 51.

On the other hand, in the display unit 40, each time the image of one line is displayed on the liquid crystal panel 42, the value indicating the displayed line (initial value is 1) is incremented, the value is output on the VRAM 51 and stored. As the result, the value indicating the displayed latest line is recorded on the VRAM 51. In the state, if these information are displayed by an user's instruction, the user can confirm whether or not the predetermined phase difference is being operated as intended by a content displayed. That is, if the value indicating the latest line of the image processed is larger than the value indicating the displayed latest line, the display does not overtake the photographing (including image processing), it is possible to determine the predetermined phase difference is appropriate.

The first timing signal generator may generate the first timing signal based on the output signal of the oscillator. That is, the first timing signal generator can be configured with a phase locked loop (PLL) that applies the divider or a multiplier to the oscillating signal. The first timing signal may be a signal to drive the sensor, and in addition to the vertical synchronization signal described above, the various kinds of signal with which the operation of the sensor is synchronized may function as the first timing signal.

The second timing signal generator may generate the second timing signal based on the output signal of the oscillator. That is, the second timing signal generator can be configured with the phase locked loop (PLL) that applies the divider or the multiplier to the oscillating signal. The second timing signal may be a signal to drive the display unit, and in addition to the vertical synchronization signal described above, the various kinds of signal with which the operation of the display unit is synchronized may function as the second timing signal.

As a matter of course, characteristic of the first timing signal and the second timing signal (such as the cycle) may be different, and the cycle of the first timing signal and the cycle of the second timing signal may coincide with each other. Examples of the former include the configuration in which the cycle of any one of the first timing signal and the second timing signal is the cycle of the integer multiple of the other. If it is the latter, it is possible to provide the photographing apparatus displaying a photographed image of one frame with the display period of one frame.

The phase difference control unit may assign the predetermined phase difference between the first timing signal and a second timing signal based on the output signal of the oscillator. The configuration to generate the signal having the predetermined phase difference can adopt various configurations, for example, using any of the first timing signal and the second timing signal as a reference, a configuration controlling a generation timing of the signal is included so that the other signal is generated after the period of time corresponding to the predetermined phase difference is elapsed from the detection of the reference.

In order to generate the predetermined phase difference, it may control the start timing of the signal so that the first timing signal and the second timing signal maintain the constant phase difference during the photographing, and the phase difference may be measured by any unit (for example, it may be a time or the number of clocks). In any case, the phase difference is defined based on the output signal of the oscillator. That is, the period of time corresponding to the predetermined phase difference or the number of clocks is defined, the phase difference is measured according to the definition based on the output signal of the oscillator, and at least one of the timing between the first timing signal and the second timing signal may be controlled at the timing synchronized with the phase difference.

In the predetermined phase difference, the delay in the display unit is minimized, and the phase difference is maintained. Therefore, the predetermined phase difference may be set so as not to generate the excessive display delay or the destabilization of the display delay period. That is, although the display is delayed than the photographing by exactly the very short period of time corresponding to the phase difference, the phase difference is set so that the excessive display delay is not displayed, such as one frame. The phase difference is set so as not to generate the destabilization, such as the delay from the photographing to the display is short in certain line and the delay from the photographing to the display long in the other line. The predetermined phase difference may be previously determined, may be determined by the instruction of the user, and may be determined by an operation mode.

As the such predetermined phase difference, for example, the phase difference corresponding to the length of the period that photographs on the sensor the information of the number of lines required for the display of any line on the display unit and the length of the period of time that processes the information in the image processing unit is included. That is, in one embodiment, the sensor and the display unit are configured of a plurality of lines, and the image is handled for each line. Specifically, the photographed image is output for each line, the processing is performed by the image processing unit. The processed image is displayed for each line on the display unit. Therefore, in order to ensure that the display line is not overtaken the photographing line (image to be displayed is generated until the display start timing), the photographing time or the image processing time for each line may be analyzed. As a result of the analysis, it is possible to previously determine the minimum phase difference such as the display line does not overtake the photographing line in any line. According to the configuration, as well as a sufficient period of time for the display of certain line, it is possible to determine the phase difference so as not to prolong more than necessary.

As a configuration example in defining the predetermined phase difference based on the output signal of the oscillator, a configuration in which a difference corresponding to the integer multiple of the photographing period of one line in the sensor or the display period of one line in the display unit is the predetermined phase difference may be adopted. That is, in a configuration in which the image is output for each line from the sensor configured of a plurality of lines, and the processing is performed for each line by the image processing unit, the image processing cannot be started unless the photographing of the predetermined number of lines (one or multiple) is completed. Since the photographing period of one line is the extremely short period of time, the approximately equivalent period of time with the period of time required for the image processing to the image of the predetermined number of lines can be defined by the integer multiple of the photographing period. Accordingly, it is easy to define the predetermined phase difference using the photographing period of one line as the unit, and it is possible to easily define the phase difference so as to minimize the delay in the display unit.

Furthermore, the photographing period of one line and the display period of one line can be easily measured based on the output signal of the oscillator. That is, the periodic synchronization signal is generally used to drive the sensor or the display unit. For example, a configuration that the first timing signal generator and the second timing signal generator generate the horizontal synchronization signal added to the vertical synchronization signal as the first timing signal and the second timing signal, is assumed. In the configuration, these synchronization signals is generated based on the output signal of the oscillator.

The photographing period of one line corresponds to one cycle of the horizontal synchronization signal of the sensor, the display period of one line corresponds to one cycle of the horizontal synchronization signal of the display unit. Accordingly, if the predetermined phase difference is defined by the difference corresponding to the integer multiple of one cycle of these horizontal synchronization signals, a start timing of the first timing signal or the second timing signal is controlled using these horizontal synchronization signals. Therefore, the signal having the predetermined phase difference corresponding to the integer multiple the photographing period of one line or the display period of one line can be easily generated.

For example, the configuration in which the predetermined phase difference is variable can adopt the configuration that the phase difference control unit receives the value indicating the predetermined phase difference, and sets the predetermined phase difference based on the received value. The configuration, for example, can be realized by a configuration that the phase difference control unit receives the user's instruction value or the value for each operation mode, and sets the predetermined phase difference based on the value. The value may be configured to be capable of inputting in various units, for example, in the configuration that causes the predetermined phase difference to be variable using the photographing period of one line or the display period of one line as the unit, the configuration to be able to input the number of lines is included. According to the above configuration, the predetermined phase difference can be easily set.

The sensor may be a sensor that is driven based on the first timing signal and captures the image. As a matter of course, it may be provided with a configuration of the lens and the aperture to photograph the image. In any case, the sensor may be driven by the first timing signal. That is, the photographing of the image or the output timing is controlled based on the first timing signal, the information which is a source of the image to be displayed may be generated.

The image processing unit may generate the image data indicating an image of a subject based on the output data of the sensor, and may display the image of the subject based on the image data on the display unit. The image processing can be configured by any kinds of the processing, the period of time required for the processing may be adapted to previously identify by statistics.

The display unit may be driven based on the second timing signal, and may display the image captured on the sensor. That is, the display timing of the image may be controlled based on the second timing signal, and the image captured on the sensor may be displayed on the display unit.

Furthermore, as in the invention, a technique that generates the first timing signal, the second timing signal, and the phase difference of both signals based on the common oscillator can be applied as a program or a method. The apparatus, the program, and the method above-mentioned have a case of being realized as a single apparatus, and a case of being realized using shared components in the apparatus having multiple functions, and include various kinds of aspect.

The entire disclosure of Japanese Patent Application No. 2016-47939, filed Mar. 11, 2016 is expressly incorporated by reference herein.

What is claimed is:

1. A photographing apparatus comprising:
   an oscillator;
   a first timing signal generator including a circuit that generates a first timing signal based on an output signal of the oscillator;
   a second timing signal generator including a circuit that generates a second timing signal based on the output signal of the oscillator;
   a phase difference control unit including a circuit that controls a phase difference between the first timing signal and the second timing signal to be a predetermined phase difference based on the output signal of the oscillator;
   a sensor that is driven based on the first timing signal;
   an image processing unit including a circuit that generates an image to be displayed based on an output of the sensor; and
   a display unit that is driven based on the second timing signal and displays an image captured on the sensor,
   the predetermined phase difference being a difference corresponding to a length of a period of time that photographs on the sensor information of the number of lines required for a display of any line on the display unit and the length of the period of time that processes the information in the image processing unit.

2. The photographing apparatus according to claim 1, wherein a cycle of the first timing signal and a cycle of the second timing signal coincide with each other.

3. The photographing apparatus according to claim 1, wherein the predetermined phase difference is a difference corresponding to an integer multiple of a photographing period of one line on the sensor or a display period of one line on the display unit.

4. The photographing apparatus according to claim 1,
wherein the first timing signal generator and the second timing signal generator generates a horizontal synchronization signal based on the output signal of the oscillator, and
the phase difference control unit controls the phase difference between the first timing signal and the second timing signal to be the predetermined phase difference corresponding to an integer multiple of one cycle of the horizontal synchronization signal.

5. The photographing apparatus according to claim 1,
wherein the phase difference control unit receives a value indicating the predetermined phase difference, and sets the predetermined phase difference based on the received value.

* * * * *